United States Patent [19]

English

[11] Patent Number: 5,417,035
[45] Date of Patent: May 23, 1995

[54] APPARATUS AND METHOD FOR MANUFACTURE FLEXIBLE RECLOSABLE CONTAINERS

[75] Inventor: William A. English, Shelbyville, Ind.

[73] Assignee: KCL Corporation, Shelbyville, Ind.

[21] Appl. No.: 241,118

[22] Filed: Sep. 6, 1988

[51] Int. Cl.$^6$ .................. B65B 9/20; B65B 61/00; B65B 61/18

[52] U.S. Cl. .................. 53/412; 53/416; 53/451; 53/133.4; 53/138.3; 53/551; 493/213

[58] Field of Search .................. 53/412, 451, 137, 551, 53/373, 550, 416, 133.4, 138.3; 493/213, 214, 302; 156/66

[56] References Cited

U.S. PATENT DOCUMENTS

| | | | |
|---|---|---|---|
| 3,593,483 | 7/1971 | Tracy | 53/551 X |
| 4,355,494 | 10/1982 | Tilman | 53/551 X |
| 4,512,138 | 4/1985 | Greenawalt | 53/373 X |
| 4,532,754 | 8/1985 | Hokanson | 53/551 X |
| 4,601,694 | 7/1986 | Ausnit | 493/214 X |
| 4,709,533 | 12/1987 | Ausnit | 53/451 |
| 4,745,731 | 5/1988 | Talbott et al. | 53/551 X |
| 4,790,126 | 12/1988 | Boeckmann | 53/451 |
| 4,812,074 | 3/1989 | Ausnit et al. | 493/214 X |

Primary Examiner—Horace M. Culver
Attorney, Agent, or Firm—Woodard, Emhardt, Naughton, Moriarty & McNett

[57] ABSTRACT

A novel apparatus and method for manufacturing flexible, reclosable containers is described herein. A continuous web of flexible film is formed into a tube around a forming tube. The lateral edges of the continuous web are guided so as to extend substantially perpendicularly from the forming tube, thereby forming a longitudinal seam. A pair of interlocked continuous fastener profile strips are then directed downwardly into the seam between the lateral edges of the film. Intermittent impulse sealing bars are utilized for heating the exterior surfaces of the seam so as to heatseal the bases of the fastener strips to the interior surfaces of the seam. Vertical longitudinal sealing bars are further provided externally from the impulse sealing bars which seal the longitudinal seam proximate the lateral edges of the continuous web. A pair of transverse sealing bars form the top seal of a first container and the bottom seal of a second container. Product may then be dispensed through the forming tube into the first container, a top seal formed across the first container by the transverse sealing bars, and the first container cut from the tube of flexible film. An improved high speed apparatus and method of manufacturing flexible reclosable containers is thereby provided.

27 Claims, 5 Drawing Sheets

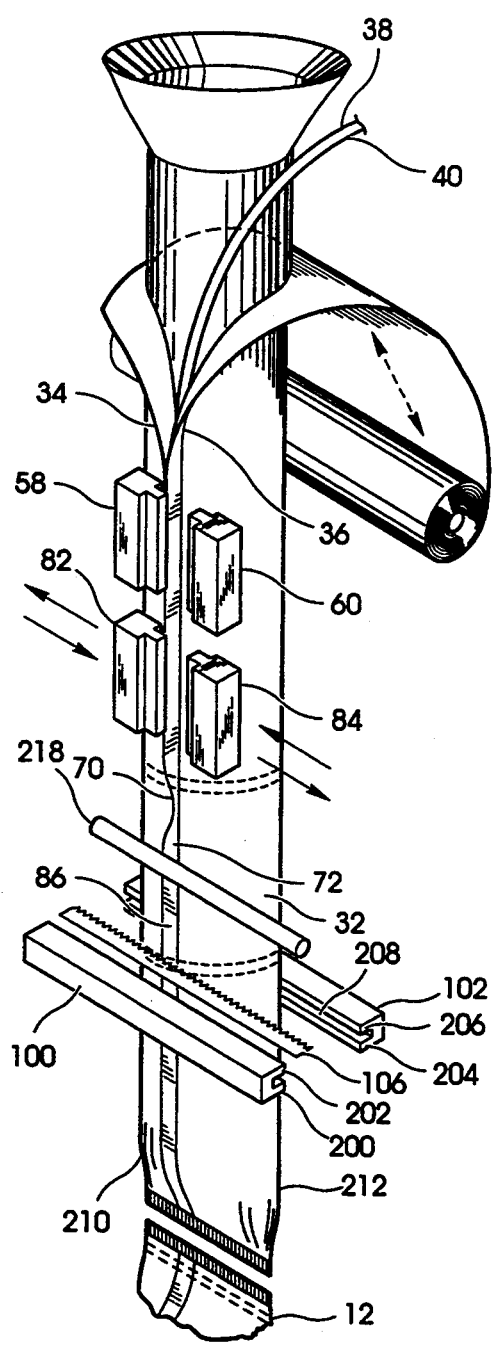
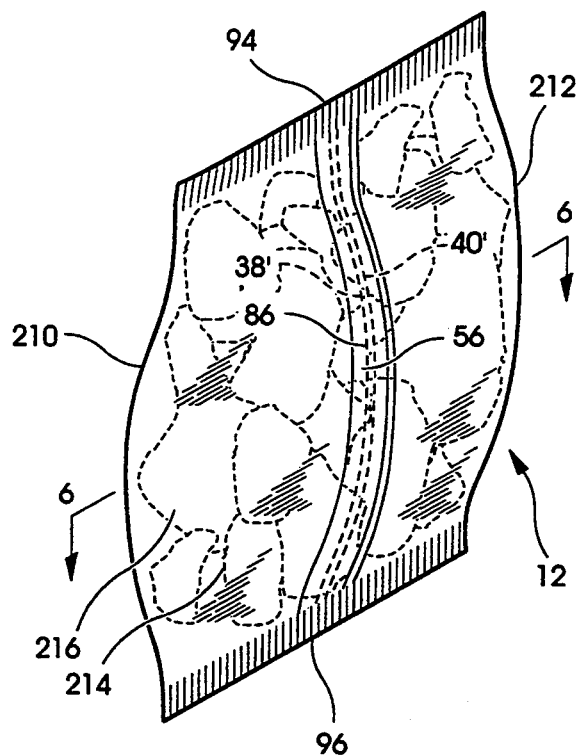
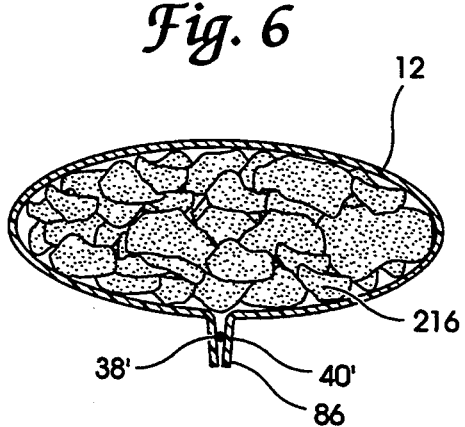

APPARATUS AND METHOD FOR MANUFACTURE FLEXIBLE RECLOSABLE CONTAINERS

BACKGROUND OF THE INVENTION

The present invention relates generally to flexible reclosable containers and more particularly to the manufacture of such containers for use in what is commonly called form, fill and seal packaging systems.

The use of flexible containers having reclosable fasteners either integrally formed in the sidewalls thereof or heat sealed thereto is widely known, as shown in U.S. Pat. Nos. 3,198,228, Naito; 3,338,284 Ausnit; and, 4,101,355, Ausnit. Similarly, the use of such containers for form, fill, seal packaging systems may be seen in U.S. Pat. No. 4,355,494, Tilman, and U.S. Pat. No. 4,617,683, Ausnit. However, in the '494 patent of Tilman, individual reclosable fastener profiles are attached to the lateral edges of a flat continuous web of film utilizing adhesive. As a result, after the web is formed into a tube, the individual profiles must be brought together and interlocked. In addition, the adhesive must be maintained under compression for a sufficient period in which to set. The speed of manufacture is thereby reduced. In the '683 patent of Ausnit, sections of fastener strips are extended transversely across the web and heat sealed thereto. Again, the speed of manufacture is thereby reduced.

Accordingly, it is an object of the present invention to provide an apparatus and method for manufacturing flexible reclosable containers in which the fastener profiles are heat sealed within the longitudinal seal of the container.

It is an additional object of the present invention to provide an apparatus for the high speed manufacture of flexible reclosable form, fill, seal containers.

SUMMARY OF THE INVENTION

The present invention is directed to an apparatus for manufacturing flexible reclosable containers, to a method of manufacturing of such containers and to the containers themselves. In one embodiment of the invention, a mechanism is provided for dispensing a continuous web of flexible film. A roll of the film is mounted on a dispensing roller and the film is pulled from the roll by one or more powered rollers or belt drives. The film is directed over a series of idler rollers to the area proximate the top of a vertical forming tube. The film is then guided around the vertical forming tube so as to form a tube of flexible film having its lateral edges extending normally from the filling tube.

A second dispensing mechanism is provided for dispensing a pair of interlocked continuous strips of fastener profile. These fastener profiles are also constructed of flexible plastic. One of the profiles may have a male configuration and the opposite profile may have a female configuration adapted for interlocking. Alternatively, a series of interlocking male and female profiles may be provided on both fastener profiles.

The fastener profiles may be extruded directly adjacent to the form fill seal apparatus and then cooled prior to utilization. Preferably, however, the fastener profiles are extruded at a separate location, interlocked, wound on spools and unrolled prior to use. The mechanism for unwinding and conveying the fastener profiles is again a powered roller system.

In a preferred embodiment, the fastener profiles are interlocked. This may be accomplished by means of guides and/or rollers which bring the fastener profiles together and provide pressure to interlock them. The interlocked fastener profiles are then guided vertically above the forming tube, across idler rollers and directed downwardly into the longitudinal seam by means of profile guides located between the lateral edges of the plastic film. The profile guides position the respective bases of each of the fastener profiles within the longitudinal seam and against the inner surface of the film. Impulse sealing bars are positioned outside of the plastic film and aligned with the respective bases of the fastener profiles. The impulse sealing bars are moved towards each other so as to compress the plastic film and the fastener profiles between them. When the plastic film is compressed, a surge of electricity is provided through the impulse sealing bars so as to heat seal the fastener profiles to the inside surface of the film.

A second set of sealing bars is disposed outside of the impulse sealing bars. These are preferably conventional heated metal bars, used to form the longitudinal seal. The bar seals and the impulse sealing bars are disposed vertically and in parallel to the axis of the longitudinal seam, with the bar seals proximate the edges of the film and the impulse sealing bars positioned more closely to the center of the tube of plastic film. The bar seals; i.e., the longitudinal sealing bars are compressed against the film in an area further outside or away from the axis of the fastener profiles then the fastener profiles so as to heat seal the seam. Both the sealing of the fastener profiles and the longitudinal seam may be accomplished simultaneously.

Following sealing of the longitudinal seam, the bottom portion of the tube of continuous film is transversely sealed by a set of horizontally disposed traverse bar seals, which are preferably of conventional bar seal design. The transverse bar sealing mechanism preferably comprises a pair of bar sealers which are horizontally disposed on opposite sides of the tube of flexible film. The transverse bar seals are heated and intermittently compressed against each other with the film in between, thereby sealing the tube of film horizontally. In a preferred embodiment, the transverse top seal bar and the transverse bottom seal bar are disposed closely adjacent to each other and substantially horizontally. One set of transverse sealing bars is on one side of the tube of flexible film and the opposite set is on the other side. Thus, when the transverse sealing bars are brought substantially into compression against one another, a top seal and a bottom seal are formed in the tube of flexible film. A desired quantity of product such as granular or other food products may then be filled through the forming tube into the bottom portion of the tube of flexible film, following formation of the bottom seal of the container. A hot wire cutting mechanism or a knife is provided for separating the individual containers from the tube of film after sealing. The cutting mechanism may be disposed between the top and bottom transverse seal or mounted separately, if desired.

The present invention also includes a method of manufacturing the flexible reclosable container mentioned above. As noted, a web of continuous film is dispensed and wrapped around a forming tube. A pair of continuous strips of interlocked flexible fastener profile are dispensed downwardly into the longitudinal seam formed on one side of the tube of flexible film. The fastener profiles and the longitudinal seam are then sealed simultaneously by separate sets of sealing bars. Transverse seals are then formed at the bottom of the container, the container is filled, a top seal is formed and the container separated from the tube.

An additional aspect of the invention is the flexible container formed by the aforesaid apparatus and method. The flexible container has a longitudinal fin seal along one edge. In parallel to the fin seal, but closer to the center of the container are the two interlocked fastener profiles, sealed to the inside walls of the container. The container may be opened by tearing or cutting the film along the space between the reclosable fasteners and the longitudinal seal. Alternatively, the longitudinal seal may be peeled open, if desired. A peelable seal may be provided by carefully controlling the pressure, dwell time and temperature of the longitudinal seal. A unique flexible reclosable container is thereby provided.

BRIEF DESCRIPTION OF THE DRAWINGS

FIG. 4 is a front perspective view, partially broken away, of an alternate embodiment of the apparatus of FIG. 1, showing in particular a first set of sealing bars for sealing of the fastener profiles to the longitudinal seam of film and a second set of sealing bars disposed below the first set, for sealing the longitudinal or fin seal.

FIG. 5 is a front perspective view of an individual container formed by the apparatus of FIG. 4.

FIG. 6 is a cross sectional view of the flexible reclosable container of FIG. 5, taken along line 6—6.

DETAILED DESCRIPTION OF THE PREFERRED EMBODIMENT

Figure 2:
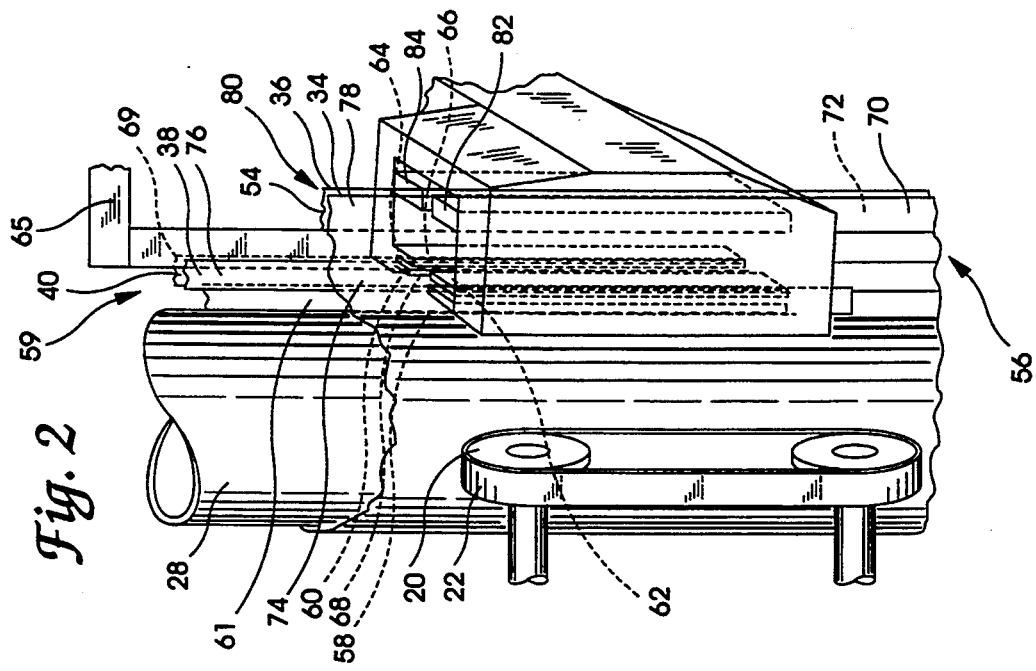
FIG. 2 is a side perspective view of the apparatus of FIG. 1.

While the present invention is susceptible of embodiment in many different forms, there is shown in the drawings and will herein be described in detail several specific embodiments with the understanding that the invention is not limited thereto except insofar as those skilled in the art who have the disclosure before them are able to make modifications and variations therein without departing from the scope of the invention.

Figure 1:
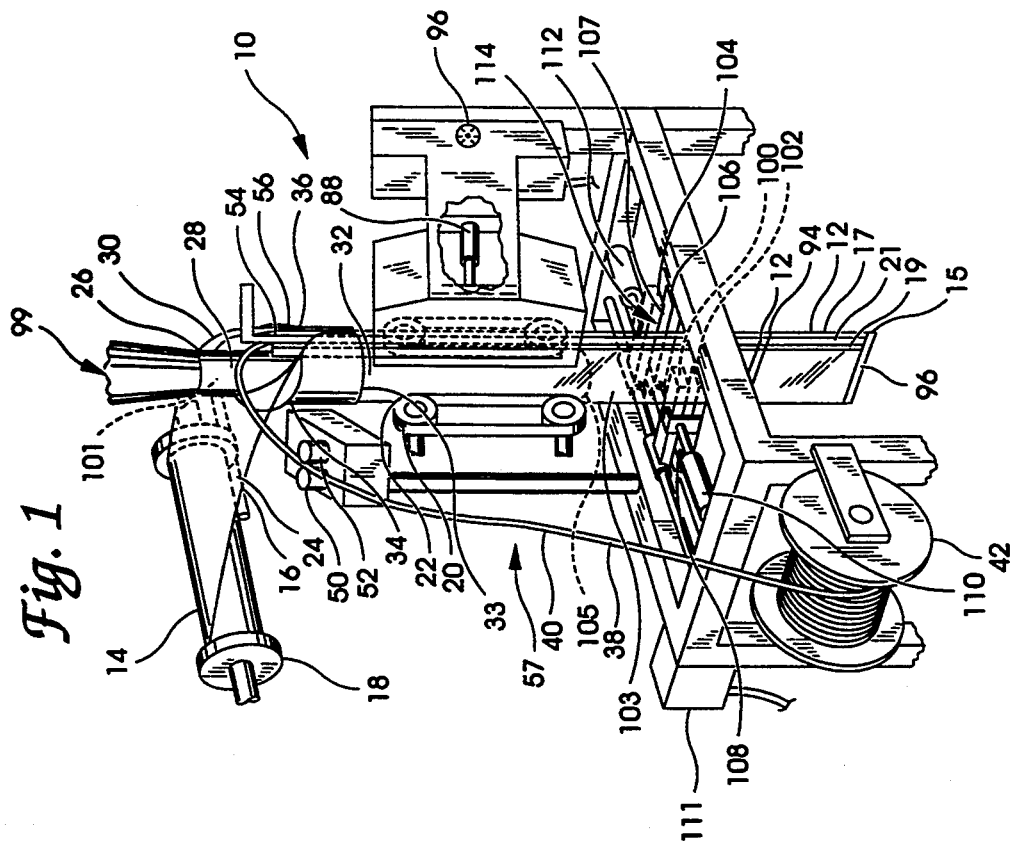
FIG. 1 is a front perspective view of an apparatus for manufacturing flexible reclosable form, fill, seal containers.

As shown in FIG. 1 of the drawings, an apparatus 10 is provided for manufacturing flexible reclosable containers 12 having a top seal 13, a bottom seal 15, a longitudinal seal 17 and flexible fastener profiles 19 and 21 disposed proximate the longitudinal seal 17 and in axial alignment therewith. Apparatus 10 includes a continuous web 14 of flexible film 16 disposed on a dispensing roller 18. Flexible film 16 may be a wide variety of typical packaging films such as polyethylene, polypropylene, or laminated film having a layer of foil or polyvinylidene chloride for barrier protection. In the case of laminated film, an interior coating of heat sealable film such as polyethylene must be present. In one embodiment of the invention, flexible film 16 may be dispensed from a dispensing roller 18 by means of powered rollers 20 which have an exterior rubber surface 22 or belt which grips flexible film 16. Flexible film 16 is advanced over idler rollers 24 in a flat configuration to an area proximate the top 26 of forming tube 28. Flexible film 16 is then directed downwardly and around forming tube 28 by means of a film guide mechanism 30 so as to form a tube 32 of flexible film having lateral edges 34 and 36 of tube 32 extending normally from filling tube 28.

Figure 8:
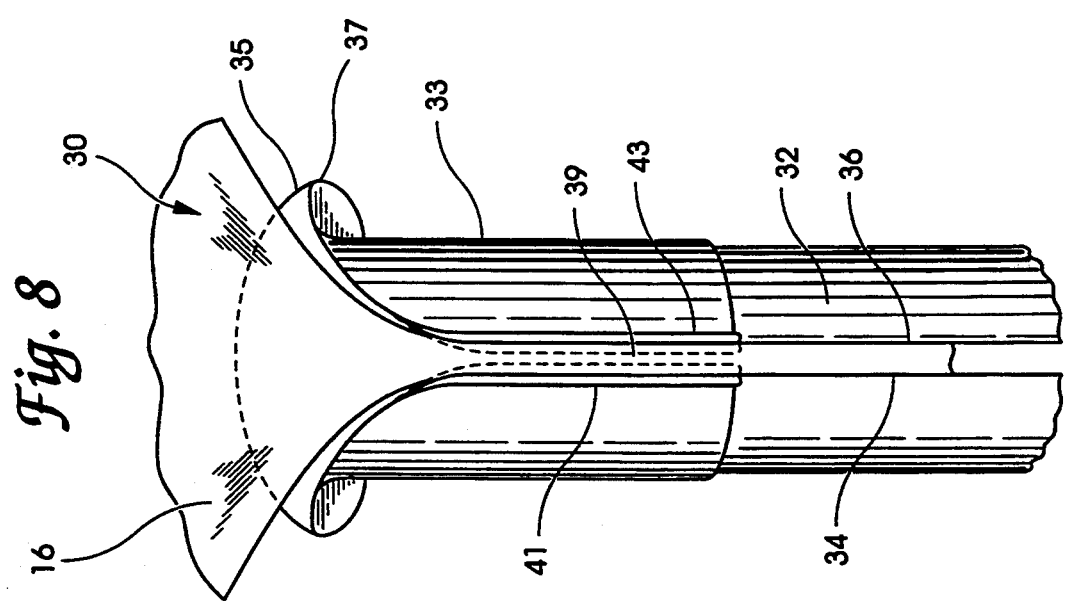
FIG. 8 is a front view, partially broken away of the film guide mechanism used to form the film into a tube, as shown in FIG. 1.

As best shown in FIG. 8, in a preferred embodiment, the film guide mechanism 30 comprises a substantially tubular collar 33 having a rolled lip 35 disposed about the periphery of the top portion 37 of the tubular collar 33. The rolled lip 35 preferably is formed as a continuous curve tangentially disposed and intersecting the top portion 37 of the collar 33. A raised longitudinal slot 39 is vertically disposed along the length of the tubular collar 33. The longitudinal slot 39 has a pair of raised sidewalls 41 and 43 extending substantially normally from the length of the collar 33. The rolled lip 35 is curved so as to funnel the continuous web of flexible film 16 into a tubular configuration 32. The lateral edges 34 and 36 of the continuous web of flexible film 16 are thereby positioned in the longitudinal slot 39 between the raised sidewalls 41 and 43 so as to extend substantially normally from the forming tube 28. An example of commonly known equipment for manufacturing form fill seal containers is the Hayssen Model Ultima, manufactured by Hayssen Manufacturing, Sheboygen, Wis.

Figure 1A:
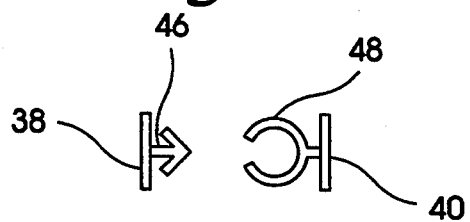
FIG. 1A is a side cross sectional view of one embodiment of the fastener profiles utilized in the apparatus of FIG. 1 of the drawings.

Returning to FIG. 1, a pair of continuous fastener profile strips 38 and 40 are provided. The continuous fastener strips 38 and 40, as shown in FIG. 1A, have mating hook mechanisms 46 and 48 for selective interlocking and reopening. Fastener profile strips 38 and 40 are preferably interlocked prior to use, and are wound on a roll 42. Examples of similar fastener profiles may be seen in U.S. Pat. No. 2,780,261, Svec. The continuous fastener profile strips 38 and 40 are dispensed from a roll 42, and are advanced by means of powered rollers 50 and 52 to the area above the filling tube 28. They may then be directed downwardly by means of the powered rollers 50 and 52 into the gap 54 in the longitudinal seam 56 formed in the space between lateral edges 34 and 36 of tube 32 of flexible film 16. Alternatively, the continuous fastener profile strips may be advanced by the movement of the film 16; that is since the continuous fastener profiles 38 and 40 are sealed to the film 16 as the film advances (as described below), the profiles similarly advance. This combination of mechanisms 57 may be used either collectively or alternatively for advancing the fastener strips.

Figure 7:
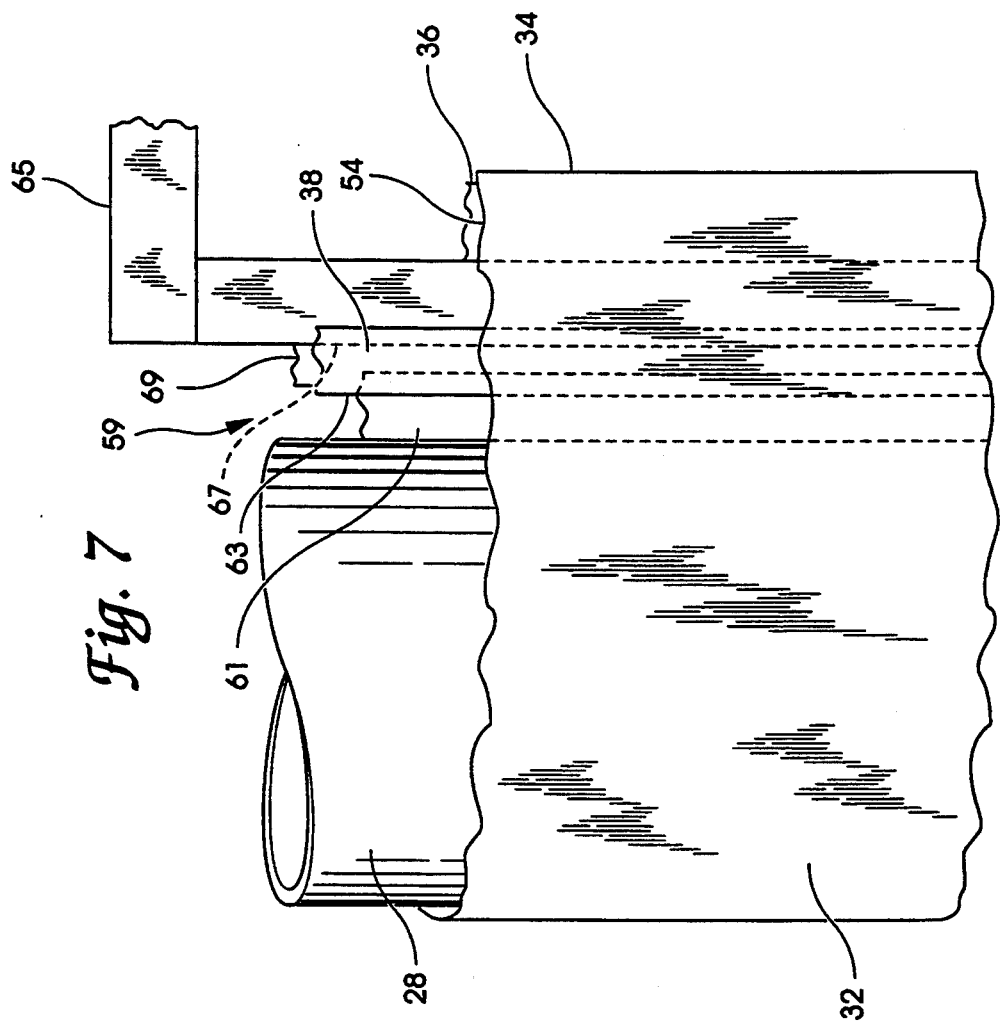
FIG. 7 is a side view, partially broken away of a schematic illustration of the apparatus of FIG. 2 showing in particular guides for positioning the fastener profiles in the longitudinal seam.
Figure 9A:
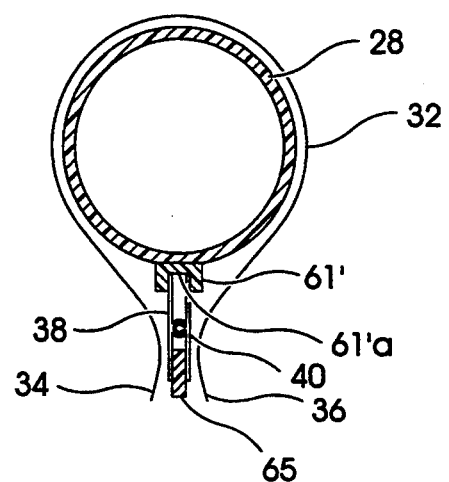
FIG. 9A is a cross-sectional view of an alternate embodiment of the apparatus of FIG. 1, showing in particular a first profile guide and a second profile guide.

As shown in FIG. 2, and 7 the mechanism 59 for guiding the interlocked continuous fastener profiles 38 and 40 within the gap 54 between the lateral edges 34 and 36 of the continuous web 14 of flexible film 16 comprises a first profile guide 61 longitudinally disposed on and fixedly attached to the forming tube 28. In the embodiment shown, the first profile guide 61 comprises a blade mounted vertically on the forming tube 28 and inserted into the space between the fastener profiles 38 and 40 so as to guide the pair of continuous fastener strips 38 and 40 downwardly along the forming tube 28. Alternatively, the first profile guide may comprise a guide 61', shown in FIG. 9A, which is a c-shaped track having a longitudinal slot 61a sized for reception of the interlocked fastener profiles 38 and 40. The first profile guide member is preferably welded to the forming tube 28. Alternatively, other commonly known means of attachment may be provided. As is evident from FIGS. 2 and 7, the forming tube 28 and the first profile guide 61 are preferably disposed in a vertical position.

As further shown in FIGS. 2 and 7, a second profile guide 65 is provided. The second profile guide 65 is vertically disposed in parallel to the axis of the filling tube 28. The second profile guide 65, in the embodiment shown is a rectangular beam having an external width adapted for insertion between the lateral edges 67 and 69 of the continuous fastener profile strips 38 and 40 when they are interlocked together. As a result, the first and second fastener profile strips 38 and 40 are slidingly disposed between the first profile guide 61 and the second profile guide 65, and are maintained in substantially parallel alignment to the axis of the forming tube 28. Once the continuous fastener strips 38 and 40 are aligned and are running parallel to the tube of flexible film 32, they may be sealed to the film 16 as described below.

Returning to FIG. 2, vertically disposed on opposite sides of lateral edges 34 and 36 are impulse sealing bars 58 and 60. The sealing bars 58 and 60 each have a nichrome wire heater 62 and 64, and are covered on both sides of the nichrome wire by a Teflon tape 66 and 68 to prevent sticking of the sealing bars to the film. The wires 62 and 64 do not come into direct contact with the film. The impulse sealing bars 58 and 60 are compressed against the exterior surfaces 70 and 72 of the tube 32 proximate the lateral edges 34 and 36 of the longitudinal seam 56. An impulse of electricity is then provided from an impulse generator as is commonly known in the art. The resultant heat causes the respective bases 74 and 76 of the continuous strips of fastener profiles 38 and 40 (shown in FIG. 1A) to become heat sealed to the opposed interior surfaces 78 and 80 of the longitudinal seam 56.

A second set of sealing bars, longitudinal sealing bars 82 and 84, are disposed outside of the impulse sealing bars 58 and 60. These longitudinal sealing bars 82 and 84 are disposed outside of but closely proximate to the exterior surfaces 70 and 72 of tube 32, near lateral edges 34 and 36, in opposed relationship to each other and in parallel to impulse sealing bars 58 and bars 58 and 60. Longitudinal sealing bars 82 and 84 are preferably constructed as heated metal bars. Alternatively, the longitudinal sealing bars 82 and 84 may comprise impulse sealers, if an impulse seal is desired.

Either following heat sealing by impulse sealers 58 and 60 or simultaneously, longitudinal sealing bars 82 and 84 are heated and compressed against the exterior surfaces 70 and 72 of longitudinal seam 56. This causes a continuous, longitudinal or "fin" seal 86 to be formed between opposing interior film surfaces 78 and 80 extending vertically on tube 32. The impulse sealing bars 58 and 60 and longitudinal sealing bars 82 and 84 are selectively compressed against tube 16 or retracted by means of hydraulic pistons 88 (90, 92 and 94 not shown).

The timing of hydraulic pistons 88–94 may be set by hydraulic controls 96 or by an electric eye 98.

As shown in FIG. 1, disposed below longitudinal sealing bars 82 and 84 are transverse sealing bars 100, 102, 104 and 106. The transverse sealing bars 100 and 102 are disposed on one side of the tube 32 of flexible film 16, and transverse sealing bars 104 and 106 are oppositely disposed; each transverse sealing bar faces an opposed sealing bar. Unlike sealing bars 58, 60, 82 and 84 the transverse sealing bars 100–106 are disposed horizontally rather than vertically so as to form a transverse top seal 94 and a transverse bottom seal 96 of container 12. In the embodiment shown the transverse top seal 94 and transverse bottom seal 96 are formed simultaneously. However, a single set of transverse sealing bars 100 and 104 may be provided so as to individually form the top seal 94 or the bottom seal 96, if desired.

As further shown in FIG. 1, a filling tube 26 is provided which extends downwardly from above continuous web 16 through and into forming tube 28.

Product such as candy, nuts, chips (best shown in FIG. 6), or even liquids may be dispensed downwardly through filling tube 26 which has a tubular bore 99 extending there through, through forming tube 28 having a similar tubular bore 101 and into container 12. The bottom portion 103 of the forming tube 28 is positioned so that after transverse sealing bars 100 through 106 seal the container 12, the bottom portion 103 of forming tube is positioned at the top 105 of an open container 12. Product may then be dispensed into the container 12 in any desired quantity, as is commonly known in the art. Following filling of container 12 with product, the top seal 94 of container 12 is formed. The individual container 12 may then be separated from the tube 32 of flexible film 16 by means of mechanism 107 which transversely cuts the tube 32 in parallel with and adjacent to the top seal 94 so as to separate the container 12 from the tube 32 of flexible film 16. In a preferred embodiment mechanism 107 may comprise a cutting knife 108 transversely disposed relative to tube 32 of flexible film 16. Alternatively, a heated wire cutting mechanism (not shown) may be utilized.

As further shown in FIG. 1, sealing bars 100 and 102 are horizontally disposed and in parallel to each other with cutting knife 108 being disposed therebetween. Sealing bars 100 and 102 are mounted on a hydraulic piston 110 which may be selectively actuated. Similarly, transverse sealing bars 104 and 106 are oppositely disposed from transverse sealing bars 100 and 102 and are mounted on a horizontally disposed hydraulic piston 112. When hydraulic pistons 110 and 112 are actuated, transverse sealing bars 100 through 106 and cutting knife 108 are compressed against the tube 32 of flexible film 16. A corresponding cutting knife 114 acts in conjunction with cutting knife 108 so as to sever tube 32. When the hydraulic pistons 110 and 112 are withdrawn, transverse sealing bars 86 through 92 are similarly withdrawn, allowing container 12 to drop from tube 32 of flexible film 16. A new top seal 94 and bottom seal 96 are thereby formed by transverse sealing bars 102 and 106 so as to form a bottom seal 96 of one of the containers 12 at the bottom 116 of tube 32.

Transverse sealing bars 100 through 106, impulse sealing bars 58 and 60 and longitudinal sealing bars 82 and 84 may be controlled by means commonly known in the art for forming flexible packages, such as an electric eye, a cam mechanism, or other commonly known devices (not shown). Similarly, the strength of electrical current required for sealing may be controlled by a rheostat, a thermostat or other commonly known electrical devices such as temperature controller 111. Likewise, the mechanism for filling container 12 may comprise conventional filing equipment such as volumetric filling systems, weight filling systems or other commonly known means of dispensing individual portions. In a preferred embodiment, apparatus 10 is constructed of metal such as aluminum or steel. Forming tube 28 and filling tube 26 are preferably constructed of stainless steel.

Figure 3:
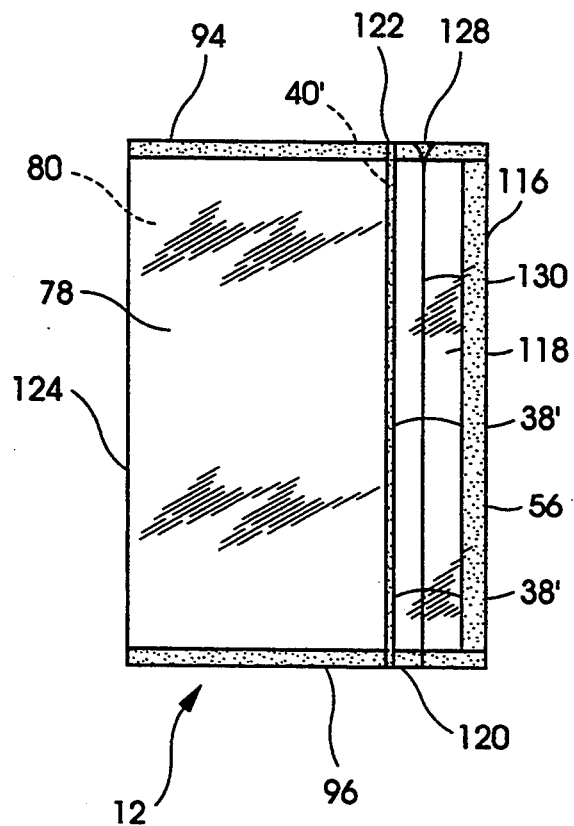
FIG. 3 is a front view of a flexible reclosable container manufactured by the apparatus of FIG. 1.

As shown in FIG. 3 of the drawings, flexible reclosable container 12 is formed from a sheet of flexible film 16 into a tube 32 having a transverse top seal 94, a transverse bottom seal 96 and a longitudinal seal 56 disposed along one side 116 of the container 12. Flexible film 16 may comprise a multi layer laminate, if desired. A pair of flexible fastener profiles 38' and 40' are heat sealed to opposing inside surfaces 78 and 80 of flexible film 16. The fastener profiles 38' and 40' are the leading portions of the continuous fastener profile strips 38 and 40 shown in FIGS. 1 and 2. The fastener profiles 38' and 40' are disposed substantially in parallel to the longitudinal seal 56 and are adapted for selectively interlocking so as to reseal the container or for selectively releasing as required. This is accomplished by means of flexible male profile 46 and flexible female profile 48 as shown in FIG. 1A. As further shown in FIG. 3, an opening portion 118 is provided which is disposed between longitudinal seal 56 and fastener profiles 38' and 40'. The opening portion 118 is constructed and arranged so as to permit selective opening of the container 12.

As mentioned above, in a preferred embodiment the longitudinal seal 56 comprises a fin seal 86; i.e., the seal is formed by flat heated bars so as to form a relatively wide flat seal. Alternately, the fin seal 56 may be formed from heated rollers. In the embodiment shown in FIG. 3 fastener profiles 38' and 40' are heat sealed at their ends 120 and 122 within top seal 94 and bottom seal 96.

As further shown in FIG. 3 a notch 128 is formed in the transverse top seal 94. The notch 128 is constructed so as to initiate opening of the container 12 between longitudinal seal 56 and fastener profiles 38' and 40' across opening portion 118, as is known in the art. Most films have a tear strength that drops significantly after a tear has been initiated; thus, the notch 128 facilitates opening of the container 12. However, in order to further enhance opening of the container 12, one or more tear lines 130 of weakened resistance such as tear line 130 may be formed in tube 32 and disposed between the fastener profiles 38' and 40' and the longitudinal seal 56. This further facilitates separation of the longitudinal seal 56 from the container 12, thereby opening of the container 12.

Turning now to FIG. 4, in an alternate embodiment of the invention, the longitudinal sealing bars 82 and 84 are designed below and in axial alignment with the impulse sealing bars 58 and 60. The longitudinal sealing bars 82 and 84 are thus more closely aligned with the lateral edges 34 and 36 of tube 32. As a result, when longitudinal sealing bars 82 and 84 are compressed against exterior surfaces 70 and 72 a longitudinal seal 56 is formed which is positioned outside of continuous fastener profile strips 38 and 40.

Disposed below longitudinal sealing bars 82 and 84 are transverse sealing bars 100 and 102. Transverse sealing bars 100 and 102 are horizontally disposed on opposite sides of tube 32. As a result when transverse sealing bars 100 and 102 are compressed against tube 32, either a top seal 94, a bottom seal 96 or both may be formed simultaneously.

In the embodiment shown in FIG. 4, a top seal sealing bar portion 200 and a bottom sealing bar portion 202 are horizontally disposed across sealing bar 100.

Similarly a top sealing bar portion 204 and a bottom sealing bar portion 206 are horizontally disposed across transverse sealing bar 102. Thus when heated and compressed against tube 32, both a top seal 94 and a bottom seal 96 are formed simultaneously.

Further shown in the schematic illustration in FIG. 4 is cutting mechanism 106. In this embodiment cutting mechanism 106 comprises a knife blade which is compressed into and through tube 32 and into a slot 208 in transverse sealing bar 102. By means of cutting knife 106, individual containers 12 may be separated from tube 32. As may be further seen in FIG. 4, in the embodiment shown, fin seal 86 is substantially equidistant from the sides 210 and 212 of tube 32.

The container 12 formed by the method shown in FIG. 4 may be seen in FIG. 5. The resulting container 12 has a fin seal 86 located along the back or rear surface 214 of the container 12. Further illustrating the posiition of fin seal 86 relative to the sides 210 and 212 of container 12 is FIG. 6. As shown in FIG. 6, container 12' contains products such as chips, candy or pieces of dried fruit 216. Fin seal 86, as shown, extends substantially normally from container 12'. However, fin seal 86 may be compressed against the rear surface 214 by means of a heated roller or plow 218, (as shown in FIG. 4) prior to top and bottom sealing by means of transverse sealing bars 100 and 102. Thus the final container 12' has the fin seal 84 substantially flat against real surface 214.

It should be further noted, that in an additional embodiment of the invention, fin seal 86 may be peelable, if desired. This may be accomplished in a number of ways. By carefully controlling the amount of pressure, heat, and the dwell time utilized in longitudinal sealing bars 82 and 84, fin seal 86 may be sealed sufficiently to remain closed during shipment, but peeled open during use. Nevertheless, it is preferable however that fin seal 86 be fixedly sealed so as to avoid the possibility of tampering with the products 216 contained therein. By means of such sealing, a novel flexible reclosable container is provided.

What is claimed is:
1. An apparatus for converting a continuous web of flexible film and continuous strips of flexible fastener profile into flexible reclosable containers having a top seal, a bottom seal, a longitudinal seal and flexible fastener profiles disposed within said longitudinal seal, said apparatus comprising:
   means for dispensing said continuous web of flexible film;
   means for forming said continuous web into a tube of flexible film having a seam longitudinally disposed thereon, said seam having opposed film surfaces and lateral edges adjoining each other, and projecting substantially normally from said tube;
   means for dispensing said continuous strips of flexible fastener profile into said seam;
   means for guiding said continuous strips of flexible fastener profile within said seam;

means for sealing the leading portions of said continuous strips of flexible fastener profile to said opposed film surfaces within said seam;

means for sealing said opposed film surfaces to each other so as to form a longitudinal seal along said joint; and, means for transversely sealing said tube so as to form said top and bottom seals of said flexible reclosable containers.

2. The apparatus of claim 1 wherein said means for dispensing said continuous fastener profile into said seam comprises:

roller means for aligning said interlocked continuous strips with said longitudinal seam;

means for guiding said interlocked continuous strips within said longitudinal seam prior to sealing to said flexible film; and, means for positioning said interlocked continuous strips during sealing to said film.

3. An apparatus for forming, filling and sealing a flexible reclosable container comprising:

means for dispensing a continuous web of flexible film;

means for forming said continuous web into a tube of flexible film having opposed film surfaces adjacent lateral edges of said tube, said opposed film surfaces projecting substantially normally from said tube so as to form a longitudinal seam therebetween;

means for dispensing a pair of interlocked flexible fastener profiles into said longitudinal seam;

means for sealing said flexible fastener profiles to said film within said seam;

means for heat sealing said longitudinal seam so as to form a longitudinal seal;

means for transversely heat sealing said tube so as to form a bottom seal of said flexible reclosable container;

means for filling said container with a desired quantity of product;

means for transversely heat sealing said tube so as to form a top seal of said container; and, means for transversely cutting said tube so as to separate said container from the remainder of said tube.

4. The apparatus of claim 3 wherein said means for forming said continuous web into a tube comprises;

a forming tube; and, means for guiding said continuous web of flexible film around said forming tube so as to form a juncture of lateral edges of said continuous web, with said lateral edges projecting normally from said forming tube so as to form a longitudinal seam.

5. An apparatus for converting a continuous web of flexible film and continuous strips of flexible fastener profile into flexible reclosable containers having a top seal, a bottom seal, a longitudinal seal and flexible fastener profiles disposed within said longitudinal seal, said apparatus comprising:

means for dispensing said continuous web of flexible film;

means for forming said continuous web into a tube of flexible film having a seam longitudinally disposed thereon, said seam having opposed film surfaces and lateral edges adjoining each other and projecting substantially normally from said tube;

means for dispensing said continuous strips of flexible fastener profile into said seam;

means for guiding said continuous strips of flexible fastener profile within said seam;

means for sealing leading portions of said continuous strips of flexible fastener profile to said opposed film surfaces within said seam;

means for sealing said opposed film surfaces to each other so as to form said longitudinal seal; and, means for transversely sealing said tube so as to form said top and bottom seals of said flexible reclosable containers.

6. The apparatus of claim 5 wherein said means for forming said continuous web into said tube of flexible film comprises: a forming tube; and, means for guiding said continuous web about said forming tube so as to form said continuous web into said tube of flexible film having said lateral edges of said tube of flexible film adjoining each other and extending substantially normally from said forming tube.

7. The apparatus of claim 6 wherein said means for guiding said continuous web about said forming tube comprises:

a substantially tubular collar member having a rolled lip disposed about the periphery of the top portion of said collar member, said collar member further having a raised longitudinal slot disposed along the length thereof, said longitudinal slot having a pair of raised sidewalls extending substantially normally from said length of said collar member; and, said rolled lip being constructed and arranged for guiding said continuous web into a tubular configuration and said raised sidewalls and longitudinal slot being constructed and arranged for extending the lateral edges of said continuous web substantially normally from said filling tube.

8. The apparatus of claim 7 wherein said rolled lip comprises a substantially continuous curve tangentially disposed and intersecting said top portion of said collar member.

9. An apparatus for forming, filling and sealing a flexible reclosable container from a continuous web of flexible film and a pair of continuous strips of flexible fastener profile, said apparatus comprising:

means for dispensing said continuous web of flexible film;

means for forming said continuous web into a tube having a longitudinal seam projecting normally therefrom;

means for dispensing said pair of continuous strips of flexible fastener profile into said longitudinal seam;

means for sealing said fastener profiles to said film within said longitudinal seam;

means for heat sealing said longitudinal seam so as to form a longitudinal seal;

means for transversely sealing said tube so as to form a bottom seal of said container;

means for filling said container with a desired quantity of product;

means for transversely sealing said tube so as to form a top seal of said container; and means for transversely cutting said tube in parallel with and adjacent to said top seal so as to separate said container from said tube of flexible film.

10. The apparatus of claim 9 wherein said means for forming said continuous web of flexible film into a tube comprises:

a forming tube; and, means for guiding said continuous web of flexible film around said forming tube so as to form a juncture of the lateral edges of said continuous web, with said lateral edges projecting normally from said forming tube so as to form a longitudinal seam.

11. The apparatus of claim 10 wherein said means for dispensing said pair of continuous strips of flexible fastener profile into said longitudinal seam comprises:
a first profile guide member longitudinally disposed on and fixedly attached to said forming tube so as to be vertically disposed in said longitudinal seam.

12. The apparatus of claim 11 wherein said first profile guide member comprises a blade vertically disposed on said forming tube and interposed between the lateral edges of said profile members, so as to guide said pair of continuous fastener strips downwardly along said forming tube.

13. The apparatus of claim 10 wherein said means for dispensing said pair of continuous strips of flexible fastener profile into said longitudinal seam comprises:
a first profile guide member longitudinally disposed on and fixedly attached to said forming tube so as to be vertically disposed in said longitudinal seam, said first profile guide member having a substantially rectangular longitudinal slot formed therein said rectangular longitudinal slot having a width substantially the same as but slightly larger than said continuous fastener profiles so as to slidingly retain and guide said continuous fastener profiles in said longitudinal seam.

14. The apparatus of claim 13 wherein said first profile guide member comprises a member having a substantially c-shaped cross-section.

15. The apparatus of claim 13 and further comprising:
a second profile guide member comprising a vertically disposed rectangular beam having an external configuration and size adapted for insertion between the lateral edges of said continuous fastener profiles when interlocked so as to slidingly retain and align said continuous fastener profiles within said longitudinal seam.

16. The apparatus of claim 11 and further comprising:
a second profile guide member comprising a vertically disposed rectangular beam having an external configuration and size adapted for insertion between the lateral edges of said continuous fastener profiles when interlocked, so as to slidingly retain and align said continuous fastener profiles within said longitudinal seam.

17. The apparatus of claim 9 wherein said means for transversely sealing a bottom seal, said means for transversely sealing a top seal and said means for transversely cutting said tube comprise a single bar sealer having an upper head, a lower head and a cutting knife horizontally disposed therebetween, said bar sealer being effective to simultaneously seal the top seal of a first flexible reclosable container and the bottom seal of a second flexible reclosable container and to thereafter separate said first and second flexible reclosable containers.

18. The apparatus of claim 9 wherein said means for transversely sealing a bottom seal, and means for transversely sealing said top seal comprise bar sealers, and said means for heat sealing said longitudinal seam so as to form a longitudinal seal comprises an impulse sealer, said impulse sealer being disposed substantially vertically and said bar sealer being disposed substantially horizontally, laterally and at a right angle to said impulse sealer so as to form said longitudinal seal along one edge of said container.

19. The apparatus of claim 9 wherein said means for heat sealing said longitudinal seam is disposed substantially vertically, laterally and at a right angle to said means for transversely sealing said tube so as to form said longitudinal seal along one edge of said container.

20. The apparatus of claim 9 wherein said means for dispensing said pair of continuous strips of flexible fastener profile comprises:
roller means for aligning said interlocked continuous strips with said longitudinal seam;
means for guiding said interlocked continuous strips within said longitudinal seam prior to sealing to said flexible film; and,
means for positioning said interlocked continuous strips during sealing to said film.

21. The apparatus of claim 9 wherein said means for filling said container comprises a filling tube axially disposed within and extending upwardly from said forming tube.

22. A method of manufacturing flexible reclosable containers comprising the steps of:
dispensing a continuous web of flexible film;
forming said continuous web into a tube, said tube having a seam longitudinally disposed thereon, said seam comprising lateral edges of said continuous web adjoining each other, and projecting substantially normally from said tube;
dispensing continuous strips of said flexible fastener profile into said seam;
sealing said continuous strips of said flexible fastener profile to said film within said seam;
longitudinally sealing said seam together proximate said lateral edges so as to form said longitudinal seal along said seam;
transversely sealing said tube so as to form a bottom seal of said container;
filling said container;
transversely sealing said tube so as to form a top seal of said container; and
severing said container from said continuous web.

23. The method of claim 22 wherein said step of transversely sealing said tube comprises:
sealing said top and bottom seals in the same plane as said longitudinal seal, so that said longitudinal seal extends between said top and bottom seal along one side of said container.

24. The method of claim 22 wherein said dispensing continuous strips step includes dispensing said strips with said flexible fastener profiles interlocked prior to insertion into said seam.

25. An apparatus for forming a vertical tubular form fill reclosable package from a sheet of flexible film and continuous strips of flexible fastener profile comprising:
a supply spout for vertically dropping contents into a tube;
means for guiding and wrapping the sheet of film about said spout to form a tube as the fin moves downwardly over said spout;
first guide means positioned relative to the spout for bringing the lateral edges of the film together in confronting relationship to form a seam;
first attaching means for joining the edges of the film to form a fin seal at a seal location;
feed means for feeding the continuous strips of flexible fastener profile into said seam between said spout and said seal location; and second attaching means for joining the continuous strips of flexible fastener profile to the inner surface of the film between said fin seal and said spout to provide a reclosable closure inside the fin seal.

26. A method of forming a vertical tubular form fill reclosable package from a sheet of flexible film comprising the steps of:

continuously feeding a supply of flexible film from a supply means;

wrapping the film into tubular shape over a filling spout bringing the lateral edges of the film together in abutting face-to-face relationship to form a longitudinal seam in the tubular shape;

attaching the laces of said edges together at a seal location to form a fin seal;

feeding a continuous supply of flexible fastener profile strips into said seam between said spout and said seal location; and attaching said flexible fastener profile strips to the inner surface of the film between said seal location and said spout to provide a reopenable closure between the fin seal and the contents of the tube supplied through the filling spout.

27. The apparatus of claim 9 wherein said means for sealing said pair of continuous strips to said film within said longitudinal seam comprises:

a pair of impulse sealers aligned with and next to the outside of said longitudinal seam and parallel to said continuous strips;

means for intermittently compressing said impulse sealers together with said continuous strips of fastener profile and said longitudinal seam being interposed therebetween; and, means for providing an electrical current to said impulse sealers of a desired strength and duration so as to effect heat sealing of said fastener strips to said longitudinal seam.

* * * * *